United States Patent
Rabinowitz et al.

(10) Patent No.: US 8,120,661 B2
(45) Date of Patent: Feb. 21, 2012

(54) IMAGE STABILIZER

(75) Inventors: Nitzan Rabinowitz, Ramat Hasharon (IL); Ira Dvir, Rishon-Lezion (IL)

(73) Assignee: Human Monitoring Ltd, Givat Hashlosha (IL)

( * ) Notice: Subject to any disclaimer, the term of this patent is extended or adjusted under 35 U.S.C. 154(b) by 446 days.

(21) Appl. No.: 12/375,023

(22) PCT Filed: Jul. 26, 2007

(86) PCT No.: PCT/IL2007/000937
§ 371 (c)(1),
(2), (4) Date: Jan. 26, 2009

(87) PCT Pub. No.: WO2008/012822
PCT Pub. Date: Jan. 31, 2008

(65) Prior Publication Data
US 2009/0256918 A1  Oct. 15, 2009

Related U.S. Application Data

(60) Provisional application No. 60/833,396, filed on Jul. 26, 2006.

(51) Int. Cl.
H04N 5/228  (2006.01)
(52) U.S. Cl. .................................................... 348/208.6
(58) Field of Classification Search ............. 348/208.99, 348/208.1, 208.3, 208.4, 208.6, 333.01, 333.11
See application file for complete search history.

(56) References Cited

U.S. PATENT DOCUMENTS

| | | | |
|---|---|---|---|
| 5,253,071 A | 10/1993 | MacKay | |
| 5,371,539 A * | 12/1994 | Okino et al. | 348/208.6 |
| 5,563,652 A * | 10/1996 | Toba et al. | 348/207.99 |
| 5,748,231 A * | 5/1998 | Park et al. | 348/207.99 |
| 6,628,711 B1 * | 9/2003 | Mathew et al. | 375/240.12 |
| 7,221,390 B1 * | 5/2007 | Kutka | 348/208.4 |
| 7,649,549 B2 * | 1/2010 | Batur | 348/208.6 |
| 7,880,769 B2 * | 2/2011 | Qi | 348/208.99 |
| 2003/0090593 A1 | 5/2003 | Xiong | |
| 2004/0201706 A1 * | 10/2004 | Shimizu et al. | 348/208.4 |
| 2005/0093987 A1 | 5/2005 | Hatanaka | |
| 2005/0179784 A1 * | 8/2005 | Qi | 348/208.1 |
| 2006/0066728 A1 * | 3/2006 | Batur | 348/208.99 |
| 2006/0244836 A1 * | 11/2006 | Batur | 348/208.1 |
| 2007/0076982 A1 * | 4/2007 | Petrescu | 382/294 |
| 2010/0079606 A1 * | 4/2010 | Batur | 348/208.6 |

FOREIGN PATENT DOCUMENTS
EP    1117251 A1    7/2001
* cited by examiner

*Primary Examiner* — Nicholas Giles
(74) *Attorney, Agent, or Firm* — Deborah Gador

(57) ABSTRACT

A method for digital video image stabilization, the method including: estimating, from at least one portion of a frame, global frame displacement between an initial reference digital video frame and a current frame in a video sequence of frames; verifying, for the entire frame, the validity of the estimated frame displacement; and compensating for the estimated frame displacement by aligning at least one frame in the sequence with respect to the initial reference frame; wherein the step of aligning includes producing a corrected motion vector for the frame to be aligned and displacing the frame within the video frames sequence in accordance with the corrected motion vector.

11 Claims, 3 Drawing Sheets

IMAGE STABILIZER

FIELD OF THE INVENTION

The present invention relates to video cameras, in general and, in particular, to an image stabilizer for filming with video cameras.

BACKGROUND OF THE INVENTION

High quality optics and full resolution video photography are becoming standard features of lightweight cellular handsets. Video camcorders get lighter and smaller. Most of the present day still picture cameras, including pocket cameras, also have the ability to shoot video.

The insertion of video photography into lightweight devices, along with the minimization of the existing camcorders and cameras, present new challenges to the camera manufacturers. On top of the shaky video produced by long zoom lenses, to which the existing state of the art OIS (optical image stabilizer) gives some improvement, a new kind of far shakier video is now generated by the way people take their videos using these lightweight devices. This jerkiness is of wider point-of-view angles than the OIS can cope with. The existing Electronic Image Stabilizers, which were integrated with cameras like the Sanyo Exacti, are also incapable of dealing with such jerkiness.

This kind of jerky video was less evident when people were using VHS camcorders that were a lot heavier and thus steadier. Conventional camcorders didn't usually produce such jerky video, also due to the fact that camcorders were usually bought by amateur photographers, who have some knowledge and understanding of photography. However, with the insertion of video capabilities to cellular handsets, practically everybody is shooting video, and the need to improve the quality of the video and correct the shooting errors and instability of the camera is one of the first priorities and demands of the lightweight handset and camera manufacturers and the consumers.

There are three types of built-in image stabilizers which are currently available: Electronic Image Stabilization (EIS), optical image stabilization (OIS) and mechanical image stabilization.

Electronic Image Stabilization

Electronic Image Stabilization (EIS) systems use electronic processing to control image stability. The EIS system kicks into action once the image hits the light-sensing chip, the Charge Coupled Device (CCD), in the camcorder. If, through its sensors, the system detects what it thinks is camera shake, it responds by slightly moving the image so that it remains in the same place on the CCD. For example, if the camera shakes to the right, the image moves to the left to compensate, thus eliminating the shake.

There are two ways EIS works to reduce the perceived movement of the image. One method increases the size of the image by digitally "Zooming" in on the image so that it is larger than the CCD. By making the image larger, the system can "pan and scan" within the image to counter the movement created by the shake. Because this system must digitally zoom in on the image to slightly increase its size, it decreases the picture resolution somewhat.

The other method of electronic stabilization uses an oversized CCD. The video image covers only about 90 percent of the chip's area, giving the system space in which to move the image. When the image is stable, the chip centers the image on the CCD. If the camera shakes to the right, the image has the space to roam to the left to compensate for the shake, keeping the subject of the image in exactly the same place on the CCD, thus eliminating the shake.

Detecting the shakes and the shakes only is the key to the effectiveness of the system. EIS systems use one of two ways to detect shaky video. Either they detect movement within the image as recorded on the CCD or they detect the actual movement of the camera.

The first method of detection analyzes the changes between the fields in each image or between successive frames. If parts of the image change in one field or frame but not the other, it indicates that the subject of the shot is moving but not the background. If, however, the entire image changes from one field to the next, it most likely means there is camera shake and the camera must correct the image. To correct the camera shake, the camera's electronics detect the direction of the movement and shift the active field or frame so that it meshes with the memorized field. A major disadvantage of this system is that, if there is a large object moving in the frame, it may be interpreted as camera shake and the camera will attempt to stabilize the subject, enhancing the jerkiness instead of canceling it. It could also switch the stabilization from moving objects to the background, blurring the image and reducing the video quality.

The camera can also use motion sensors to detect camera shake. Because this method senses movement in the camera not the image, the movement of a subject in the image cannot fool it. However, it will sometimes react at the beginning of an intentional camera movement (such as a pan) and will take a short moment to realize that the camera is being moved on purpose. Instead of a smooth pan, the image will freeze and then leap into the pan suddenly.

Optical Image Stabilization

The Optical Image Stabilization (OIS) system, unlike the EIS system, manipulates the image before it gets to the CCD. Because of this, the image is stable when it hits the chip and completely fills the chip's surface area.

The system uses a liquid-filled bellows system between a pair of glass plates. The bellows creates the equivalent of a glass prism. The prism moves the image slightly to maintain its center as it passes through the lens. As the image passes through the prism, the lens reduces or eliminates the image shake by detecting and matching the frequency and size or amplitude of the shake and rotating the plates of glass, thus changing the angle of the prism. One of the plates of glass rotates vertically, moving the image up and down. The other plate of glass rotates horizontally, moving the image to the right or left. As with the EIS system, the idea is to move the image in the opposite direction from the shake. If there is no motion detected, the prism mechanism centers itself. The sensors can also detect when the mechanism is nearing its movement limit and will reduce the amount of correction to ease the shake back into the picture, thus avoiding a sudden jolt in the image when the prism hits its movement limit.

Mechanical Image Stabilization

Mechanical image stabilization involves stabilizing the entire camera, not just the image. The easiest way to create a mechanical image stabilization system is to put the camera on a tripod. However, when it is desired to physically move the camera from one point to the next, a mechanical image stabilization system, such as a Steadicam or GlideCam, is needed.

The Steadicam and GlideCam systems use the camera's center of gravity, a counterbalance system and the camera operator's body to maintain smooth motion. These systems mount the camera on an arm which is attached to a body harness or held in the operator's hand, using the operator's arm strength for balance. The camera maintains a level axis unless adjusted by the operator, creating a smooth, floating image.

Accordingly, there is a long felt need for an image stabilization mechanism suitable for video cameras in handheld portable devices, and it would be very desirable if such mechanism were able to reduce jerkiness while correctly identifying intended camera motion.

SUMMARY OF THE INVENTION

There is provided according to the present invention a method and apparatus for image stabilization, which takes an input image sequence including a plurality of frames and performs a reduced procedure of motion vectors estimation (ME) on a series of successive frames, using all of or only a fraction of the frame's groups of pixels. The reduced ME process of one embodiment of the invention, relies on the identification of "global frame distinctive anchors" and their matching on a frame to frame (or field to field) basis, avoiding the need for exhaustive, and possibly misleading, full-frame ME, as described in any former art, thus minimizing the computational complexity to a fraction of the existing solutions, and enhancing the quality and reliability of the procedure.

The present invention provides also an equivalent accelerated procedure to a full direct search of the main centric portion of the frame as a single block of pixels, in full resolution space, for the global motion estimation of successive frames. This is accomplished by down sampling and then employing one of the existing state of the art non linear global optimization methods.

Efficient and accurate stabilization of lightweight portable camera videos, of the type which film while walking, cannot be achieved by using the output of motion vectors of the kind which is used today in video encoders. The jerkiness caused by "walk and shoot" camera operation demands a very large matching range between successive frames, sometimes exceeding ±15% of the frame. Such matching range tends to produce erratic motion vectors, which could result in inefficient stabilization. The "global frame distinctive anchors" based process does not suffer from this limitation.

An acceptance test, based on a decision criterion associated with specific pre-designed geometrical patterns of neighboring groups of pixels, filters out small intra-frame moving objects during the reduced motion estimation procedure, whose inclusion could bias the global motion detection.

A majority voting procedure then follows, applied to the set of the remaining estimated motion vectors, to determine the frame global motion displacement.

The motion vectors identified by the voting procedure as being the result of unintended camera movements are integrated using a variable GOP size accumulative linear smoothing procedure, so as to produce, for each frame, a corrected motion vector to be used for the alignment of the frame within the video frames stream, placing each frame within approximately equal distance within the series of frames, thus creating a smoother (to the eye "stabilized") motion effect.

According to one embodiment of the invention, each frame in the video frames stream is aligned. According to another embodiment of the invention, only one frame, preferably the one before the last in the selected sequence, is aligned, thereby requiring less memory.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
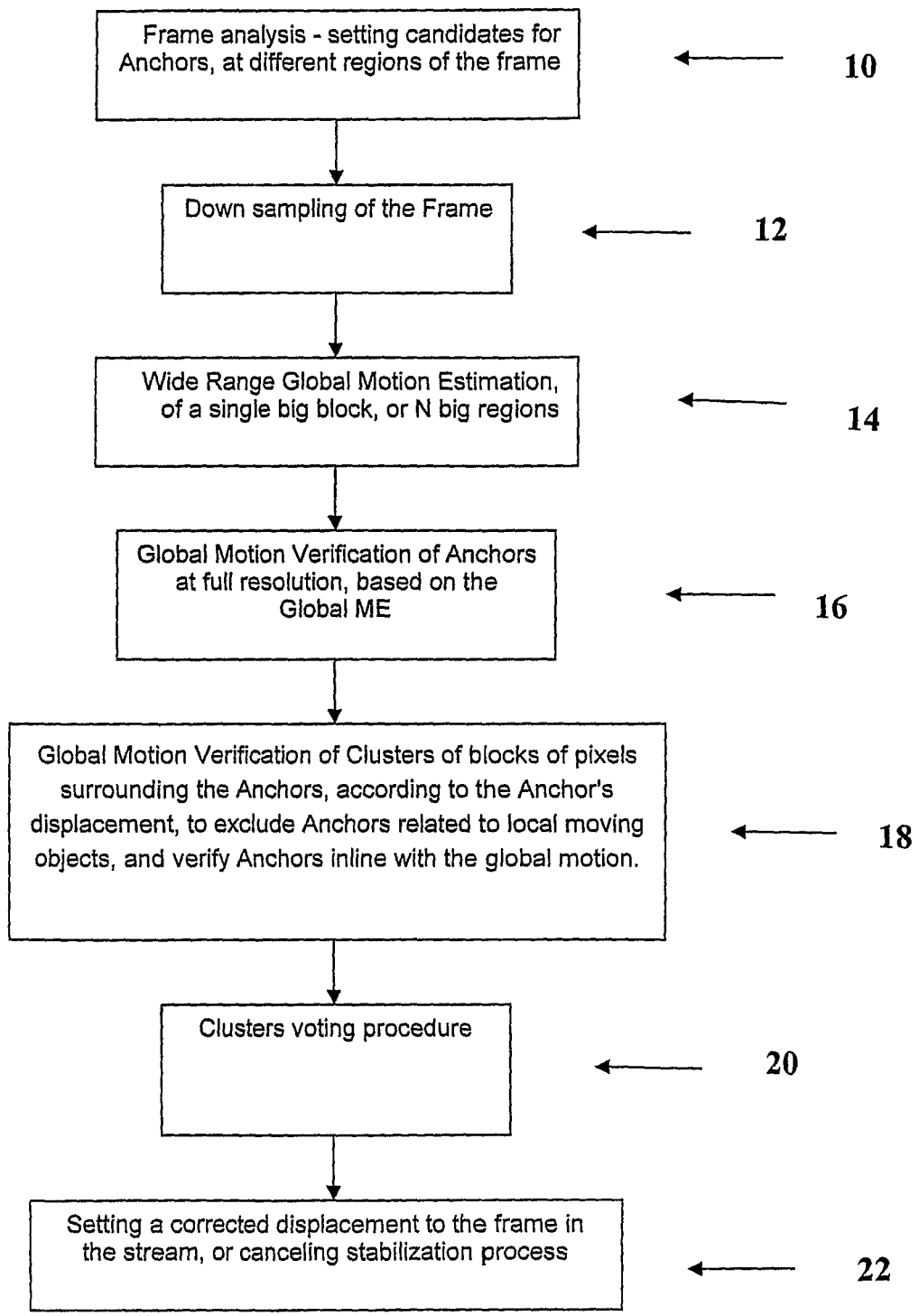
FIG. 1 is a flow chart illustrating operation of a video camera image stabilizer constructed and operative in accordance with one embodiment of the present invention.

The present invention is concerned with handheld electronic devices, as well as other types of devices including video cameras, camcorders and virtually any type of electronic device which incorporates a video camera. Video footage acquired by such devices is often shaky when viewed, where the camera shake refers to random or quasi-random unintended and often unsystematic motion on a frame-level basis.

The present invention is concerned with an electronic image stabilization system. In particular, the invention relates to methods and apparatus for digital video image stabilization, canceling video jerkiness through identifying and compensating for video frames movement attributed to unintended camera instability and/or irregularity of the camera motion, while ignoring intra-frame movement of various objects. This is accomplished by applying corrected displacement coordinates for repositioning of one or more misaligned frames within a sequence of still-video frames, and realigning such frames in accordance with human temporal motion perception, thereby resulting in motion-video output which is smoother to the eye.

Three categories of motion within and between successive still-video frames are distinguished: a. Intended—like panning, tilting and zooming; b. Intra-frame—like motion of objects within the frame or lighting changes; c. Inter-frame irregularity—indicating, in most cases, unintended camera motion, unless it is a desired effect.

The primary goals of the invention are to address three aspects of video sequences: A. Reliable filtering out of intra-frame motion of various objects; B. Reliable differentiation between wanted and unwanted motion between video frames, and correcting motion which is not inherent to the video sequence; and C. Minimizing the required computational load, to allow the implementation of the suggested invention by lightweight, low power, handheld devices.

The present invention includes two principal procedures:

A. A procedure for Global Motion estimation;

B. A procedure to align one or more frames in a sequence of successive frames with respect to the initial reference frame, in view of the Global Motion estimation.

According to one embodiment of the invention, insignificant frame to frame intra-frame motion is removed by estimating global frame displacement. This is accomplished through the execution of a selected best match procedure applied to down-sampled, or decimated, pairs of the original frames. Then, the coordinates of the estimated global frame displacement are verified by identifying distinctive matching points of both intra-frame motion and inter-frame motion, estimating their associated motion vectors, and applying a voting procedure so as to qualify (as candidates for estimating global displacement) only those motion vectors attributed to jerky camera motion. From these motion vectors, the global displacement is statistically determined.

Procedure A for global motion estimation includes two optional processes, depending on the limitations of the computational capabilities of the target device. A very accurate global motion estimation can be based on a direct search, or a method like a direct search, in an attempt to find the best fit match of the main centric portion of the frame as a single block of pixels, in full resolution space. This estimation can be utilized for the global motion estimation of successive frames. This exhaustive process may be impractical due to the need to search a rather wide range, using many pixels. For example, a direct search of a main block of 540×360 (covering ⅔ of full resolution standard definition TV) in a range of ±64 pixels (which is hardly sufficient) results in a SAD (Sum of Absolute Difference) calculation of over 95 Billion pixels per second. The use of a hierarchical search is impractical, due to the fact that such a search can lead to global mismatch. However, using a suitable fast global optimization algorithm, such as Powell Method, Conjugate Gradient, Down Hill Simplex method, Steepest Descent, or other non-linear programming method to allow global motion estimation using full-resolution can provide reliable global motion estimation. Such optimization methods are likely to converge to the true Global Motion values due to the fact that the error contour map associated with the fitting procedure of the centric block typically expressed as a smooth 2-D function.

To allow a more practical implementation, a method having three main steps is disclosed in one embodiment of the present invention: execution of a reduced motion examination procedure; activation of a voting procedure; and determination of a global movement estimation from the voting results.

Execution of a reduced motion estimation procedure, where only a fraction, which can be a tiny fraction, of the frame's blocks (or macro blocks) is used for the calculations may be accomplished using the following stages. This method is illustrated in the block diagram of FIG. 1.

I. Estimation of 2-D frame approximate global motion by calculating the displacement of the frame's central block (which may extend to about 75% of the frame's pixels, but is not limited to this percentage). This estimation may be carried out, for example, using a coarse-to-fine estimation, where the frame is down-sampled (block 12), preferably to 4, and the resulting coarse search is refined using, typically, a confined search of about ±3 pixels in the space of full resolution. It will be appreciated that alternative quantities may be utilized in performing this estimation and are also within the scope of the invention.

II. Selecting a preferred set of candidates throughout the frame for the purpose of providing distinctive matching points (block 10). The selection comprises a set of "Anchor-candidates"—a sorted list of blocks or groups of pixels within the frame, where the sorting is carried out with respect to the "anchor-candidate" complexity. An anchor-candidate consists of a group of pixels which contain complex video data only. Gradually changing background (without contrast), for example, will not be accepted as an anchor. The selection is accomplished by applying a complexity metric to groups of pixels within the frame, possibly in the shape of macro blocks.

III. Estimation of motion vectors associated with these "anchor-candidates" (block 14), and verifying the candidates as anchors (block 16) only if their match is below a predefined threshold, according the L1 norm or any other norm. The anchors search is typically centered around the global displacement coordinates found in step I.

IV. Verifying the validity of the anchor's motion vector by applying the anchor's motion vector to its adjacent groups of pixels (block 18). If a significant number of such neighboring groups of pixels prove to have similar motion vectors, the candidate is verified as an anchor.

One preferred embodiment of motion vector estimation of groups of pixels which are adjacent to the Anchor is by employing an "Epidemic Spreading Model" (ESM). The ESM model is a Cellular Automata-based model, consisting of spatially distributed elements which can become excited as a result of interacting with neighboring elements. One can formulate the spread of motion estimation process between pairs of frames as an ESM model, where interaction between two neighboring groups of pixels is defined by a criterion stating that an accepted match of one group of pixels implies an accepted match by the other (excitation). An ESM application for the motion estimation procedure starts by selecting one distinctive group of pixels (an anchor-candidate) and searching for its best match. If such a match is found (with respect to the required fit threshold), then a search for the best match of a few neighboring groups of pixels is initiated, where the search for each neighboring group of pixels is centered around the corresponding neighbors of the anchor, and the search window is typically confined to a short range, preferably of about ±3 pixels. The next stage is to select one of the excited neighboring groups of pixels (if such exists), declare it as an anchor, declare the old anchor as "done with", and repeat the process. The process is terminated whenever the total number of excited groups of pixels with respect to a given anchor-candidate exceeds a threshold pre designed level, indicating that the anchor is validated.

Figure 2:
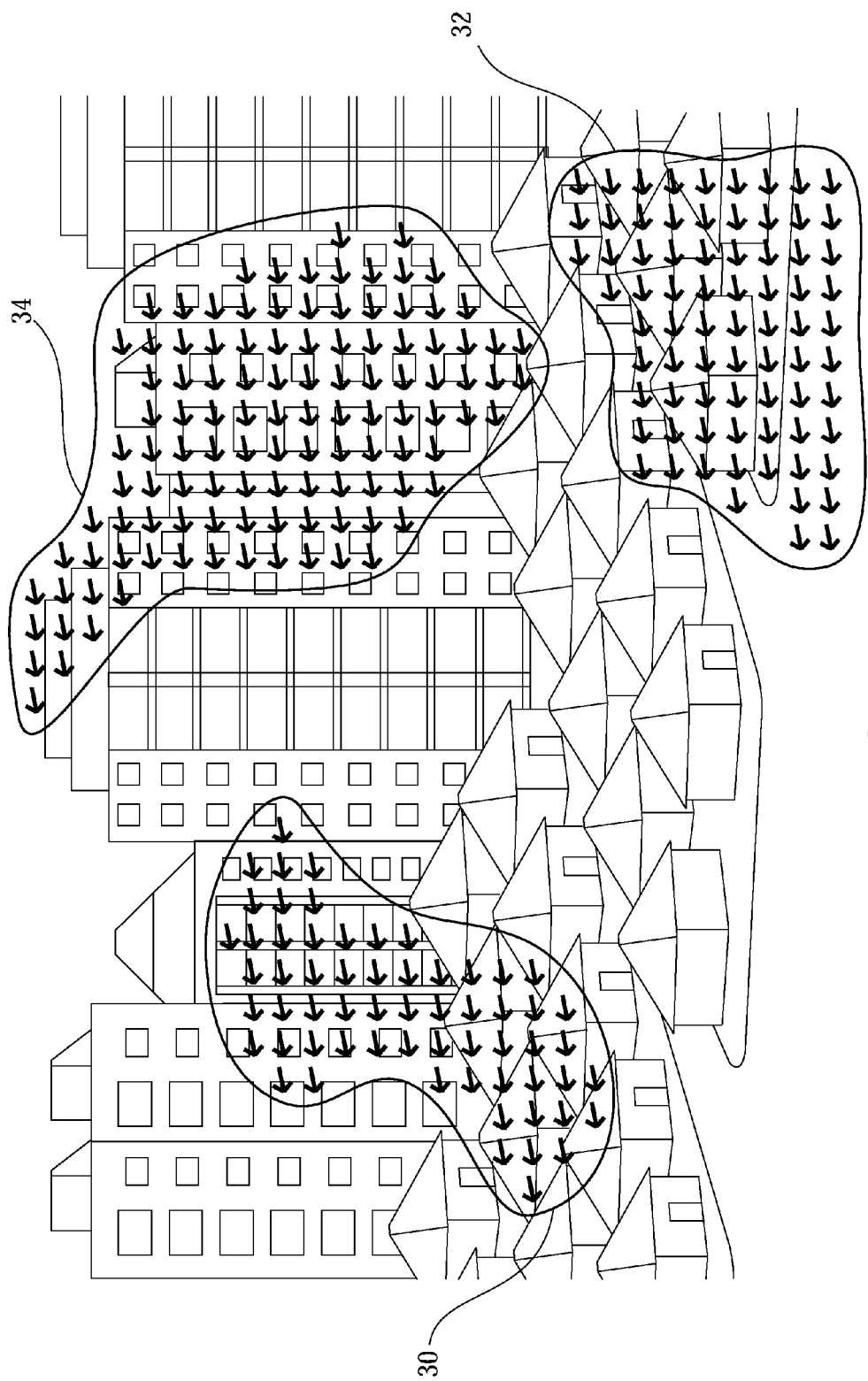
FIG. 2 is a schematic illustration of an image illustrating global motion verification according to one embodiment of the invention.

V. Generating a set of clusters of motion vectors, where each cluster is centered on a verified anchor and comprises coherent vectors. See, for example, FIG. 2, which illustrates global motions of three different clusters of blocks of pixels, indicated by reference numerals 30, 32, 34, illustrated as motion vectors, indicated by arrows.

Thus, estimation of motion vectors associated with the anchor-candidates and their adjacent portions of the frame (preferably typical video macro blocks) is carried out, so as to construct a set of clusters of motion vectors, where each cluster is centered on an anchor-candidate and includes coherent vectors. The global nature of the frame displacement value is then evaluated by enacting a voting procedure between all these clusters (block 20 in FIG. 1).

It will be appreciated that incoherent global motion vectors (motion vectors that have irregularity and vary in their X and Y amplitude over a series of frames) are associated with unintended camera movement. Failure to find matching blocks within acceptable SAD fitness values in significant portions of the frame indicates a contradiction between global and intra-frame motion (and, beyond a certain level, may even indicate a scene change). These frames are ignored in the stabilization process.

Activation of the voting procedure is realized by a series of decision rules, whose result is to filter out intended motions that are attributed to the video sequence, and eventually yield the approximate global motion estimate. The decision rules preferably include:

I. For each anchor, a two-line pattern consisting of horizontal and vertical groups of pixels, intersecting at that particular anchor, is built. Motion vector estimations for the groups of pixels associated with this pattern are evaluated. Identical vectors appearing in both horizontal and vertical lines at a pre-selected frequency (preferably the occurrence of 3 identical sets of vectors, but not limited to this number) indicates the global frame motion direction.

II. A majority voting procedure is applied so as to qualify only motion vectors (anchors) attributable to jerky camera motion. The voting procedure is designed so that the anchors and their associated clusters are extracted from a plurality of subdivisions of the frame, thereby ensuring a proper weighting (in the voting procedure) of motion vectors appearing in the background (peripheral regions) of the frame. Preferably the clusters are extracted from 5 subdivisions of the frame, although, alternatively, any other number of subdivisions may be utilized. The global displacement is statistically determined from the qualified motion vectors.

III. In the case where it is impossible to extract anchors using the above spatial distribution, an ordinary vote between all the generated clusters is applied.

IV. Where a camera zoom is detected, which is manifested through the detection of conflicting motion vector directions between the central region of the frame and its complementary circular peripheral region, vectors associated with the central region have a preference in the weighting procedure over the vectors associated with the peripheral regions of the frame.

Once the motion vectors have been estimated according to the above procedure, successive frames are aligned (block 22) so as to reduce the jerkiness associated with unintended camera movement.

Procedure B to align a sequence of successive frames with respect to the initial reference frame includes a computer program that manipulates (employing several variations) a sequence of successive frames by integrating and smoothing their respective displacement values, so as to accurately align them with respect to the initial reference frame in the sequence.

For an initial preset number of frames of a video sequence or Group of Pictures (GOP), a procedure to integrate and smooth frame displacement so as to accurately align them with respect to the initial reference frame, may be applied using the following rules:

a. assigning zero displacement to the first and the last frames in the GOP; and b. correcting the GOP's normalized frame displacements by projecting them on the line connecting the two end points of the GOP with the displacement coordinate of the frame having the maximum displacement.

This procedure to align frame displacements with respect to the initial reference frame may be carried out using an adaptive number of frames. In this scheme, the GOP length is set dynamically as a function of maximum allowable displacement distance with respect to the initial frame coordinates in the GOP. In this scheme, the frame coordinates at the beginning and end of the GOP are also fixed to be zero. According to one embodiment, the number of frames in a GOP is set dynamically and independently as a function of maximum allowable number of frames from said reference frame or maximum allowable vertical distance with respect to the GOP initial frame.

Figure 3:
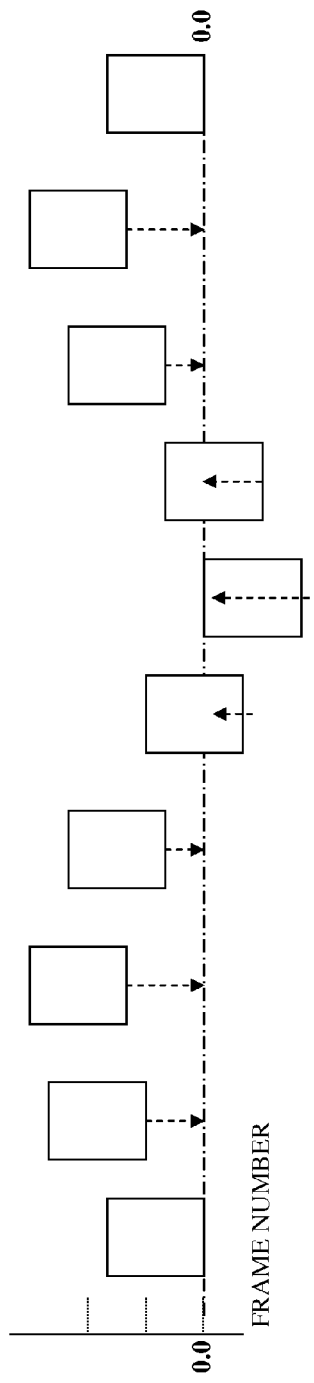
FIG. 3 is a schematic illustration of frame alignment according to one embodiment of the invention.

In these embodiments, substantially all the frames in the sequence between the first frame and the last frame are aligned. While this method produces a smooth view to the eye, it requires a relatively large memory to store all the frames to be aligned, as illustrated in FIG. 3, which illustrates one embodiment of frame alignment, where the x axis indicates frame number, the boxes represent frames in the GOP, and the y axis indicates frame displacement corrections.

However, many stabilization applications dictate that the alignment computational procedure should store in the memory the smallest possible number of frames. The quality of the stabilization procedure may vary according to the number of frames that is used. Such requirements and constraints range from zero frames in the memory (i.e. minimum latency, typically required by real time critical applications) up to a few dozen frames (viable for off-line applications, such as video editing). One embodiment of the current invention presents an alignment procedure that can be tailored in advance, or even change adaptively on-the-fly, to the number of allowable frames in the memory, according to the platform or the application demands.

The alignment procedure according to this embodiment predicts a virtual trajectory of the camera movement based on "past" and\or "future" frames coordinates, where each pair of coordinates of an incoming frame can be corrected relative to this trajectory. This idea can be expressed formally by utilizing the following definitions:

vn is the Global Displacement of a frame n (relative to its preceding frame);

Dn=Sum [vi, {i,0,n}], defined as the accumulative (sum of) global displacements of n frames;

Dm=mean {Dn−m, ... Dn}, defined as the average of past m accumulative displacements ending at frame n;

{dnx,dny}=Delta=Dm−Dn, defined as the deviation of the coordinates of frame n from the "virtual camera trajectory"; and Correction=−Delta, defined as "compensation" for the above deviation.

Alignment as a function of the number of stored frames in the memory can be carried out as follows:

Case of zero frames: The operator Dm contains the value of the incoming frame n, and past m frame coordinates (together with their associated Dn values, whose values are preserved in the memory). In this case, each frame is aligned, if necessary, when it is obtained, and no frame data is stored in the memory.

Figure 4:
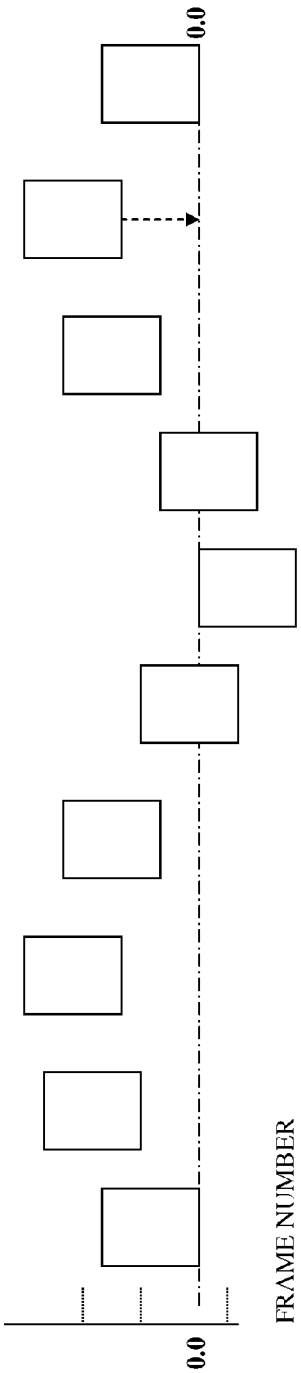
FIG. 4 is a schematic illustration of frame alignment according to another embodiment of the invention.

Case of one stored frame: Here, frame n is stored in the memory and frame n+1 is the next incoming frame. Calculations of vn and vn+1 (global motion estimations) are carried out. Under the assumption that the values of past m−1 frame coordinates (and their associated accumulative displacement values) are known, the operator Dm is now defined as: mean {Dm−1, ..., Dn, Dn+1}, and the Correction value, −Delta is applied only to the frame n, as illustrated in FIG. 4, a schematic illustration, according to another embodiment of the invention, of frame alignment, where the x axis indicates frame number, the boxes represent frames in the GOP, and the y axis indicates frame displacement corrections. In this way, data of only one frame, together with frame coordinates and displacement values for the additional frames in the sequence, is stored at a time. This embodiment provides a smooth view to the eye, substantially equal to that achieved by alignment of every frame, with substantially smaller memory and latency requirements.

Case of k stored frames: The same calculation as for storage of a single frame can by applied in this case. However, the Dm operator is now defined as: mean {Dm−1, ..., Dn, Dn+1,Dn+k}. This option is suitable where low latency is not required and/or where a larger memory is not a problem.

It is important to note that, according to a preferred embodiment of the invention, the length of the past, as well as future, stack values coordinates can be modified dynamically, and even on-the-fly, to a specific stream type. For example, a stream with frequent camera movement changes should be associated with small stacks, and vice versa. In this way, the required calculations and memory usage can vary, as required by the particular video sequences, and calculations for multiple frames need be carried out only when significant inadvertent camera movement is detected.

The alignment procedure described above is concerned with stabilizing a moving camera. In the case where the camera is in a fixed position, a major modification is introduced. The alignment procedure according to the current invention, in case of a static camera, is that the corrections of the frame's displacements should be taken relative to coordinates of a single reference frame. The reference frame is preferably refreshed as soon as refreshing is possible, to a new reference frame, in accordance with pre-selected refreshment criteria. This serves to avoid increasing distance drift due to changes in the scene between the reference frame and the input frames, which are being aligned according to that reference frame. The refreshment criterion should be set so as to select a frame whose displacement coordinates distance are sufficiently close within a pre-defined range of deviation, to the starting reference frame, within a maximum pre-defined time interval.

According to one embodiment of the current invention, the stabilization procedure can be temporarily interrupted when abrupt changes in the stream content occur. Such changes can be attributed, for example, to light changes, or scene changes, where alignment is not appropriate or desirable. The current invention presents an algorithm that, first, detects such changes and, once such a "scene change" is declared, notifies the main stabilization algorithm to halt the stabilization process for a pre designed period, or until a normal frame to frame distance, typical of a fluent video stream, is re-detected.

One example of such a detection method is as follows. The scene detection algorithm is applied to three consecutive frames, f1, f2 and f3. The resulting fitting values (e.g., L1 norm) from the global estimation procedure described above, related to f1-f2 and f2-f3, are defined as L12 and L23. A scene change is declared whenever the absolute difference between L12 and L23 exceeds a pre-selected value (typically, set to be 17 per pixel), or whenever the value of L12 exceed pre-selected value.

Preferably, the various procedures described above are followed by applying a cropping procedure to eliminate flickering of frame margins, which can be created by displacement of frames within a stream. Any skilled person familiar with the process of cropping margins of a frame will be aware of methods for carrying out this procedure.

According to one embodiment of the invention, the cropping is carried out using an oversized CCD\CMOS that displays to the user only the cropped center of the image, thus obscuring from the user the cropping phase. The full resolution of the optical sensor may be used for the stabilization process, but only the part of the frame which is in line with the stabilized target resolution of the frame is displayed to the user. Any person skilled in the art will be familiar with the process of cropping an oversized CCD\CMOS frame.

The computer program of the present invention is able to reduce jerkiness in video streams only within certain limits. If the displacement due to unintentional motion is too large, the program will not attempt to stabilize it (block 22 of FIG. 1). Thus, the method of the present invention permits an "ALWAYS ON" setting mode for stabilization on the camera. This means that, if no distinctive match between successive frames is found, the video stream will not be adjusted for a given number of frames within the sequence. Typically, a failure to obtain a distinctive match is due to video quality or another reason like: fuzzy frames, extreme lighting change and cut. This break in frame adjustment occurs whenever the summation of the motion vectors, which fail the acceptance test metric, indicate the possibility that the frame contains moving objects and that stabilization according to such objects or the background could result in conflicting perspective biases, and could damage the video quality.

The Always-ON preferred implementation is to skip stabilization to the end of a GOP, or start a new GOP once a distinctive match between two successive frames is found, or try skipping a no-match frame and match with the successive frame of the no-match frame. The "Always-ON" feature is activated whenever the voting procedure produces weighted conflicting results, indicating conflicting perspective biases.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

What is claimed is:

1. A method for digital video image stabilization, the method comprising:
    estimating, in a processor, from at least one portion of a frame, global frame displacement between an initial reference digital video frame and a current frame in a video sequence of frames;
    verifying, for the entire frame, validity of said estimated frame displacement; and
    compensating for said estimated frame displacement by aligning at least one frame in said sequence with respect to said initial reference frame;
    wherein said step of aligning includes:
        producing a corrected motion vector for said frame to be aligned; and
        displacing said frame within the video frames sequence in accordance with said corrected motion vector;
    wherein the step of estimating global frame displacement comprises:
        in a full resolution space, calculating a best match of a centric portion of the current frame as a single block of pixels associated with said current frame and said reference frame;
    wherein said step of calculating the best match of the centric portion comprises calculating an overall fit (L1 norm) by down sampling and then employing a non-linear programming global optimization procedure;
        wherein said non-linear programming global optimization procedure is selected from the group including Powell method, conjugate gradient method, and Down-Hill Simplex.

2. The method according to claim 1, wherein said step of aligning includes:
    for an initial preset number of frames of a video sequence (GOP):
        a. assigning a zero displacement to a first and a last frame in the GOP; and
        b. correcting normalized frame displacements of said GOP by projecting normalized frame displacements of said GOP on a line connecting two end points of the GOP with a displacement coordinate of a frame in said sequence having a maximum displacement.

3. A method, for digital video image stabilization, the method comprising:
    estimating, in a processor, from at least one portion of a frame, global frame displacement between an initial reference digital video frame and a current frame in a video sequence of frames;
    verifying, for the entire frame, validity of said estimated frame displacement; and
    compensating for said estimated frame displacement by aligning at least one frame in said sequence with respect to said initial reference frame;
        wherein said step of aligning includes:

producing a corrected motion vector for said frame to be aligned; and displacing said frame within the video frames sequence in accordance with said corrected motion vector; and for an initial preset number of frames of a video sequence (GOP):
- a. assigning a zero displacement to a first and a last frame in the GOP; and
- b. correcting normalized frame displacements of said GOP by projecting normalized frame displacements of said GOP on a line connecting two end points of the GOP with a displacement coordinate of a frame in said sequence having a maximum displacement.

4. The method according to claim 3, wherein said step of compensating includes:

calculating a mean of accumulative global motion displacements values associated with a stack of frames of size N, ending at said current frame, calculating a deviation of frame displacement of the current frame, resulting from said global frame displacement estimation, from said calculated mean of accumulative displacements values; and setting compensation coordinates equal to a negative value of said deviation.

5. The method according to claim 4, wherein said stack of N frames includes frames before and after the current frame in the frames sequence.

6. The method of claim 3, wherein said steps of assigning a zero displacement and correcting said GOP's normalized frame displacements are carried out using an adaptive number of frames.

7. The method according to claim 6, wherein a length of said GOP is set dynamically as a function of maximum allowable displacement distance with respect to initial frame coordinates in the GOP, and frame coordinates of said first and last frames of the GOP are fixed to be zero.

8. The method according to claim 6, wherein a number of frames for each axis is set dynamically and independently as a function of maximum allowable number of frames from said reference frame and maximum allowable vertical distance with respect to the GOP first frame.

9. The method according to claim 3, further comprising applying a cropping procedure to eliminate flickering of frame margins.

10. The method according to claim 9, comprising utilizing full resolution of an optical sensor for said method for digital video image stabilization, and displaying only a part of the frame which is in line with a stabilized target resolution of the frame.

11. The method according to claim 3, further comprising displaying stabilized video frames on an oversized CCD\CMOS that displays only a cropped center of a recorded video image.

* * * * *